(12) United States Patent
Tsai

(10) Patent No.: US 11,009,154 B1
(45) Date of Patent: May 18, 2021

(54) ADJUSTABLE CLAMP STRUCTURE

(71) Applicant: CYCLE NAME INDUSTRIES CO., LTD., Taoyuan (TW)

(72) Inventor: Tsung-Pei Tsai, Taoyuan (TW)

(73) Assignee: CYCLE NAME INDUSTRIES CO., LTD., Taoyuan (TW)

( * ) Notice: Subject to any disclaimer, the term of this patent is extended or adjusted under 35 U.S.C. 154(b) by 0 days.

(21) Appl. No.: 16/667,504

(22) Filed: Oct. 29, 2019

(51) Int. Cl.
   *F16L 3/10* (2006.01)
   *F16B 2/12* (2006.01)
   *F16B 2/10* (2006.01)

(52) U.S. Cl.
   CPC .............. *F16L 3/1075* (2013.01); *F16B 2/10* (2013.01); *F16B 2/12* (2013.01)

(58) Field of Classification Search
   CPC .............. F16L 3/1075; F16B 2/10; F16B 2/12
   USPC .... 248/228.4, 229.23, 229.13, 231.51, 316.4
   See application file for complete search history.

(56) References Cited

U.S. PATENT DOCUMENTS

| | | | | |
|---|---|---|---|---|
| 1,893,702 A * | 1/1933 | Glenn | ...................... | F16B 7/048 248/218.4 |
| 3,797,079 A * | 3/1974 | Nixon | ...................... | F16L 23/10 24/285 |
| 9,106,069 B2 * | 8/2015 | Frizzell | ..................... | H02G 3/32 |
| 9,551,438 B2 * | 1/2017 | Frizzell | ................ | H02G 3/0456 |
| 10,436,362 B2 * | 10/2019 | Ahrens | ..................... | F16L 23/06 |
| 2010/0261390 A1 * | 10/2010 | Gardner | .................... | H01R 4/40 439/775 |
| 2019/0086007 A1 * | 3/2019 | Ahrens | ..................... | F16B 2/14 |
| 2020/0207279 A1 * | 7/2020 | Kulick | ..................... | F16B 2/10 |

\* cited by examiner

*Primary Examiner* — Kimberly T Wood
(74) *Attorney, Agent, or Firm* — Muncy, Geissler, Olds and Lowe, P.C.

(57) ABSTRACT

An adjustable clamp structure includes a first clamp member comprising a first clamping portion and a first fixing portion formed on one end of the first clamping portion, a second clamp member comprising a second clamping portion and a second fixing portion formed on one end of the second clamping portion; and an adjustment member disposed between the first clamp member and the second clamp member. The adjustment member has an adjusting portion and a pivot portion that are movably combined. The adjusting portion is disposed on another end of the first clamping portion, and the pivot portion disposed on another end of the second clamping portion. The first and second clamp members are combined through the adjustment member and form a clamp distance therein. The second clamp member is movably adjusted with respect to the first clamp member for clamping the tubes with different diameters.

3 Claims, 6 Drawing Sheets

ADJUSTABLE CLAMP STRUCTURE

BACKGROUND OF THE INVENTION

1. Field of the Invention

The present invention relates to clamp structures, and more particularly, to an adjustable clamp structure.

2. Description of the Related Art

A conventional tube clamp, used for clamping and fixing a tube, is a fix structure with single function and unable to be adjusted. Therefore, the conventional tube clamp is only suitable for the tube member with single tube diameter, failing to meet the demand of clamping tubes with different diameters.

SUMMARY OF THE INVENTION

The present invention aims at resolving the incapability of a conventional tube clamp for being adjusted according to different tube diameters in order to clamp tubes with different tube diameters. Therefore, the present invention discloses an adjustable clamp structure. With the adjustable clamp distance of the clamping structure, the tubes with different tube diameters are allowed to be clamped. Thus, the utility of the present invention is improved.

For achieving the aforementioned objectives, an adjustable clamp structure is provided, comprising a first clamp member, a second clamp member, and an adjustment member. The first clamp member comprises a first clamping portion and a first fixing portion formed on one end of the first clamping portion. The second clamp member comprises a second clamping portion and a second fixing portion formed on one end of the second clamping portion. The adjustment member is disposed between the first clamp member and the second clamp member. The adjustment member comprises an adjusting portion and a pivot portion that are movably combined. The adjusting portion is formed on the other end of the first clamping portion, and the pivot portion is formed on the other end of the second clamping portion, wherein the first clamp member and the second clamp member are combined through the adjustment member, such that a clamp distance is formed between the first clamping portion and the second clamping portion. Also, with the adjustment member, the second clamp member is allowed to be movably adjusted with respect to the first clamp member, thereby adjusting a range of the clamp distance.

With such configuration, the clamp distance between the first clamp member and the second clamp member is movably adjustable, so as to provide the functionality of the clamp for clamping tubes with different tube diameters, improving the utility scope and fulling the convenience demand of actual usage.

DETAILED DESCRIPTION OF THE INVENTION

Figure 1:
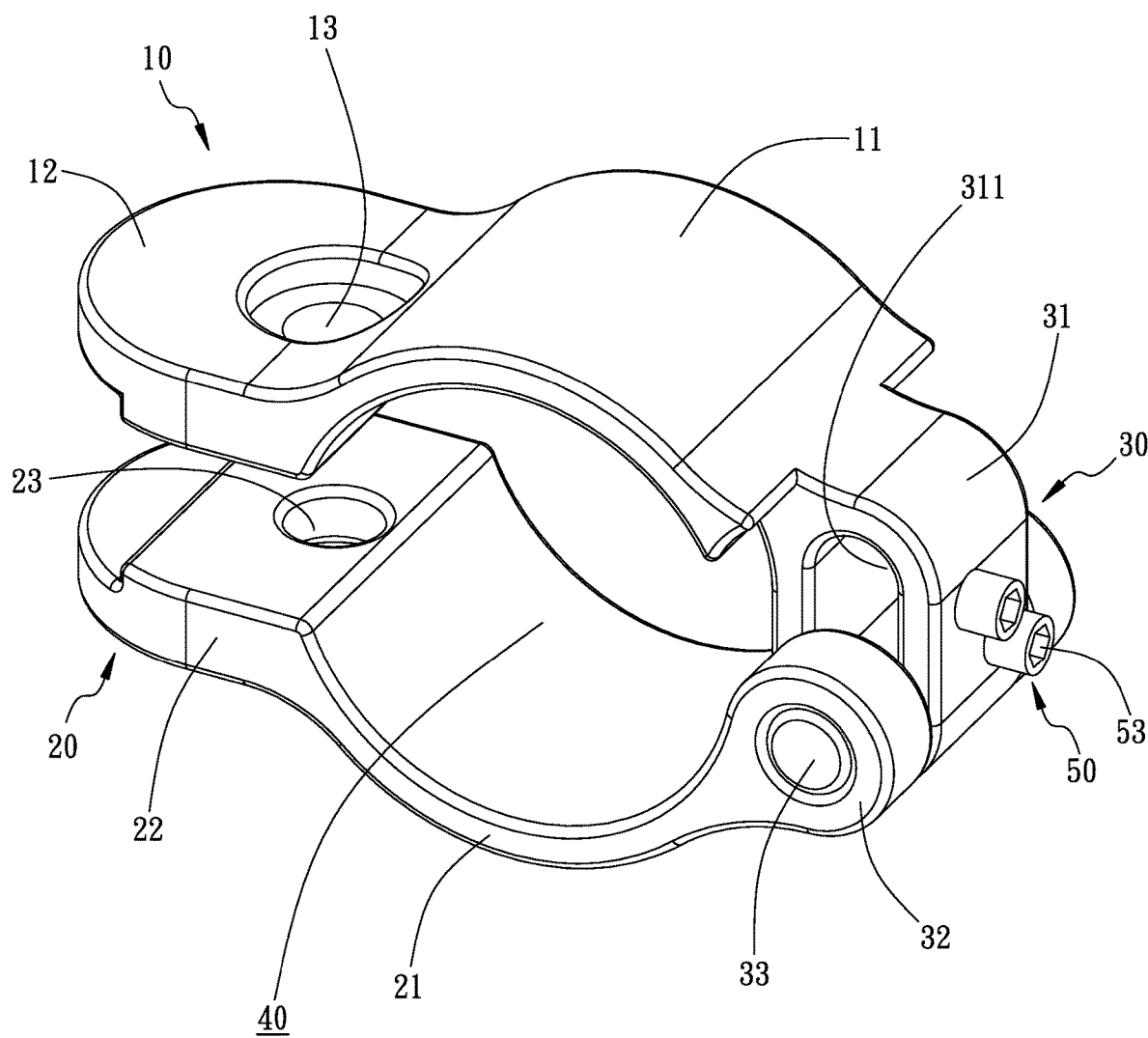
FIG. 1 is a perspective view of the clamp structure in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 6, the present invention provides an adjustable clamp structure 100 for clamping tube members 1 with different tube diameters. The clamp structure 100 comprises a first clamp member 10, a second clamp member 20, and an adjustment member 30.

The first clamp member 10 includes a first clamping portion 11 and a first fixing portion 12, wherein the first fixing portion 12 is formed on one end of the first clamping portion 11.

The second clamp member 20 is structurally similar to the first clamp member 10. The second clamp member 20 includes a second clamping portion 21 and second fixing portion 22, wherein the second fixing portion 22 is formed on one end of the second clamping portion 21. Therein, the first clamping portion 11 and the second clamping portion 21 are both formed in a semi-circular shape. The first fixing portion 12 has a bore 13, and the second fixing portion 22 has a bore 23, wherein the two bores 13, 23 are arranged in alignment, such that a fastener (not shown) is allowed to pass through the bores 13, 23 for stably combining the first clamp member 10 and the second clamp member 20.

The adjustment member 30 is disposed between the first clamp member 10 and the second clamp member 20. The adjustment member 30 comprises an adjusting portion 31 and a pivot portion 32. The adjusting portion 31 is longitudinally disposed on the other end of the clamping portion 11, and the pivot portion 32 is disposed on the other end of the second clamping portion 21. Therein, the first clamp member 10 and the second clamp member 20 are combined through the adjustment member 30, such that an approximately circular shaped clamp space 40 is formed between the first clamping portion 11 and the second clamping portion 21 for receiving the tube member 1. Also, a clamp distance 41 is formed between the first clamping portion 11 and the second clamping portion 21, and the clamp distance 41 is in the clamp space 40 and defined as the tube diameter of the corresponding tube member 1. Therefore, the clamp distance 41 is movably adjustable between the first clamp member 10 and second clamp member 20 through the adjustment member 30.

Figure 2:
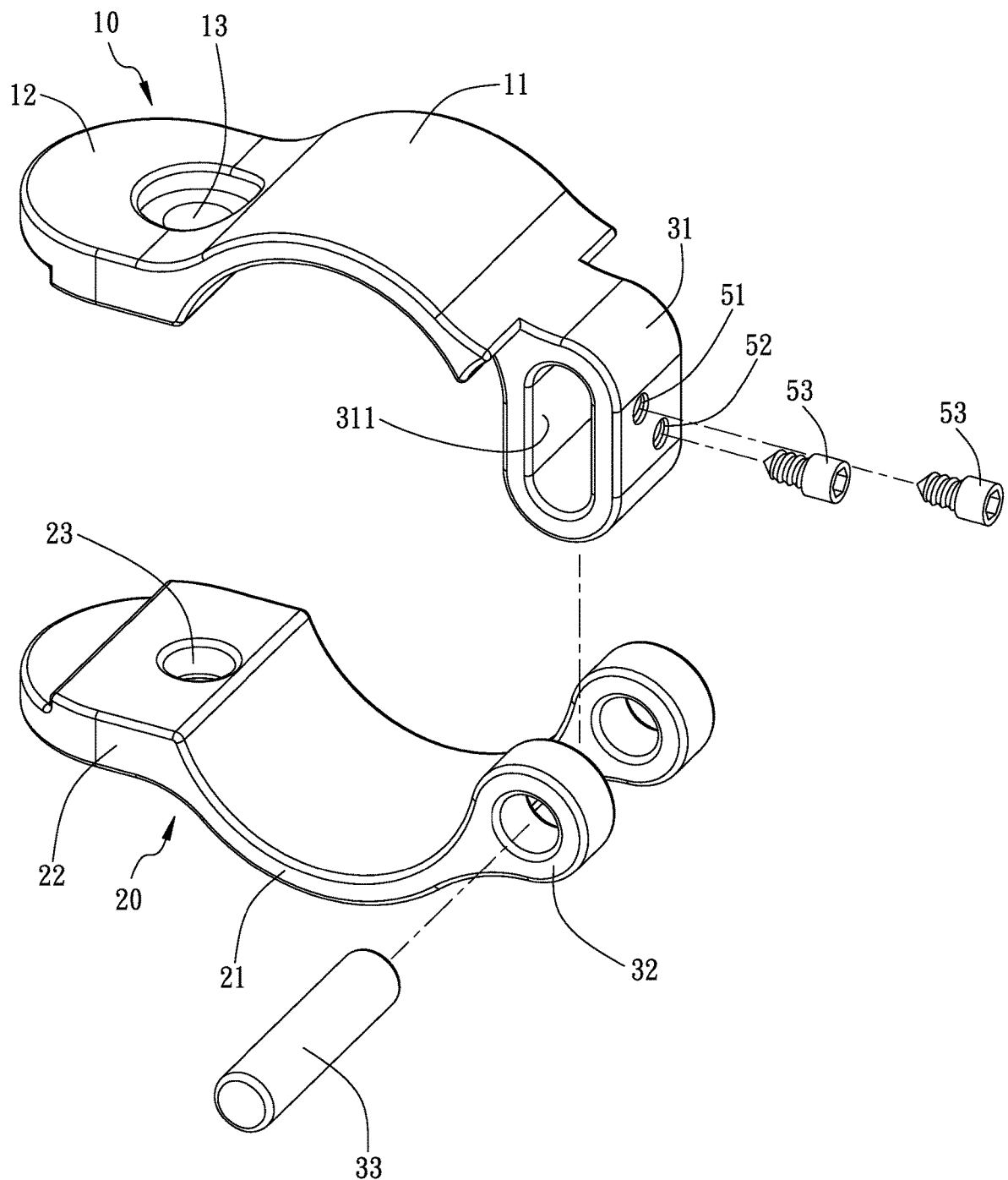
FIG. 2 is an exploded view of the clamp structure in accordance with an embodiment of the present invention.
Figure 3:
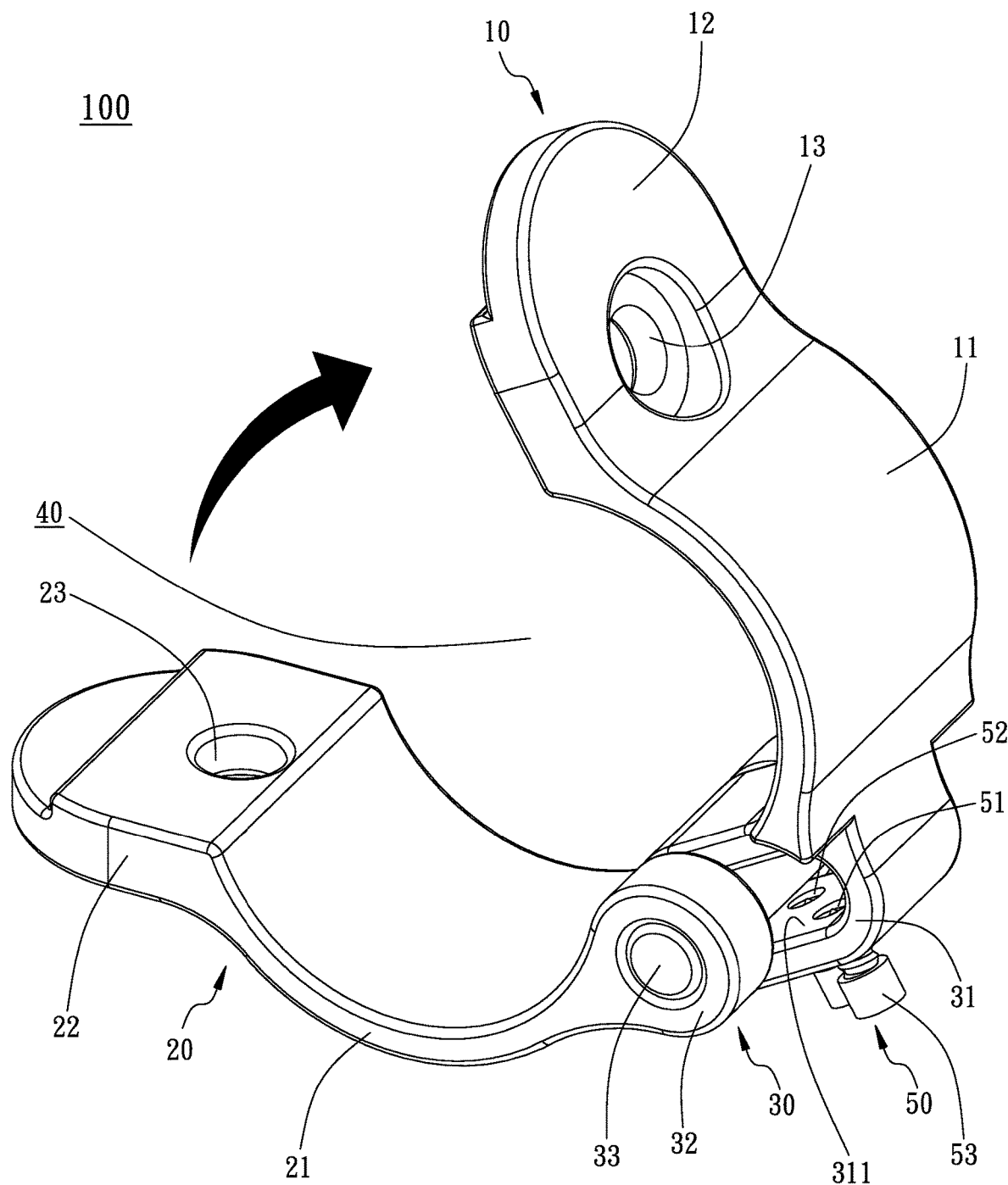
FIG. 3 is a schematic view illustrating the first clamp member and the second clamp member pivoting with respect to each other.

Referring to FIG. 1 to FIG. 3, the adjusting portion 31 comprises a groove 311. The pivot portion 32 is disposed on two sides of the adjusting portion 31 and arranged in alignment with the groove 311. An axial shaft 33 passes through the groove 311 of the adjusting portion 31 and the pivot portion 32, such that the pivot portion 32 and the adjusting portion 31 are movably combined, whereby the second clamp member 20 pivots to open and close with respect to the first clamp member 10. Also, the axial shaft 33 is applied for moving the pivot portion 32 along the groove 311 for movably adjusting the range of the clamp distance 41, so that the clamp space 40 is able to receive the tube members 1 with different tube diameters, thus improving the utility and the convenience of usage of the present invention.

Further, the present invention includes a positioning member 50 disposed on the adjustment member 30 for blocking the movement of the axial shaft 33 of the adjustment member 30. Therein, the positioning member 50 comprises a first through hole 51, a second through hole 52, and a positioning rod 53. The first through hole 51 and the second through hole 52 penetrate the adjusting portion 31, with the positioning rod 53 passing through the first through hole 51 or the second through hole 52 to resist against the axial shaft 33 in the groove 311, thereby preventing the axial shaft 33 from actively moving back, such that the pivot portion 32 is positioned at one end of the adjusting portion 31. However, the present invention is not limited to the embodiment hereby provided. In other embodiments, the engagement strength is allowed to be adjusted through the axial shaft 33 and the groove 311 of the adjusting portion 31, thereby achieving the positioning function between the axial shaft 33 and the groove 311.

Figure 4:
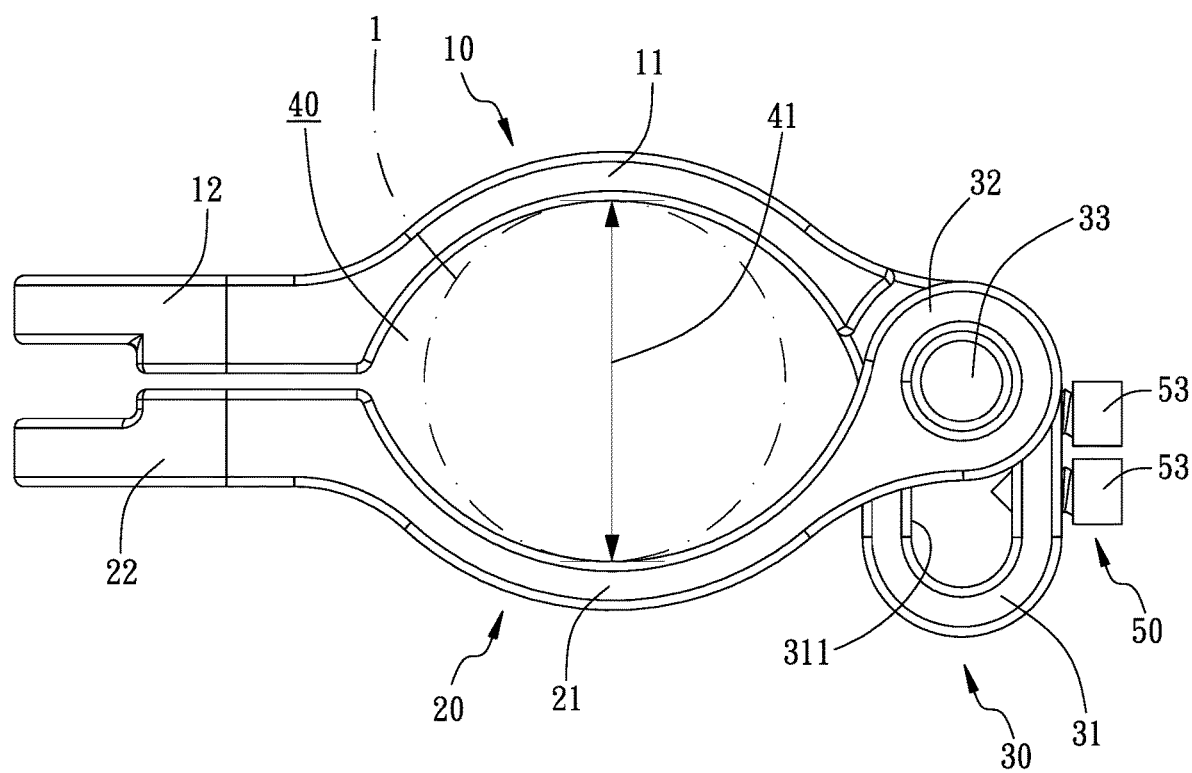
FIG. 4 is an operation schematic view illustrating the positioning rod passing through the first through hole, such that the first clamp member and the second clamp member moving toward each other.
Figure 5:
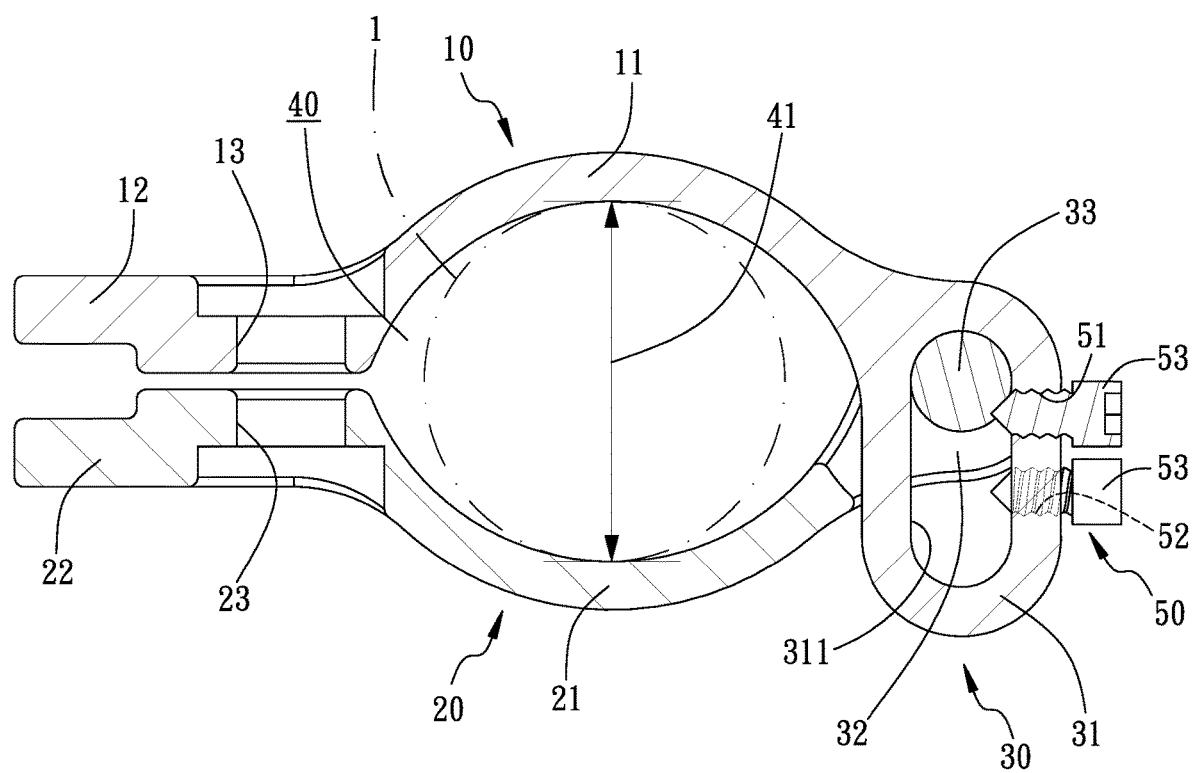
FIG. 5 is a sectional view of FIG. 4.
Figure 6:
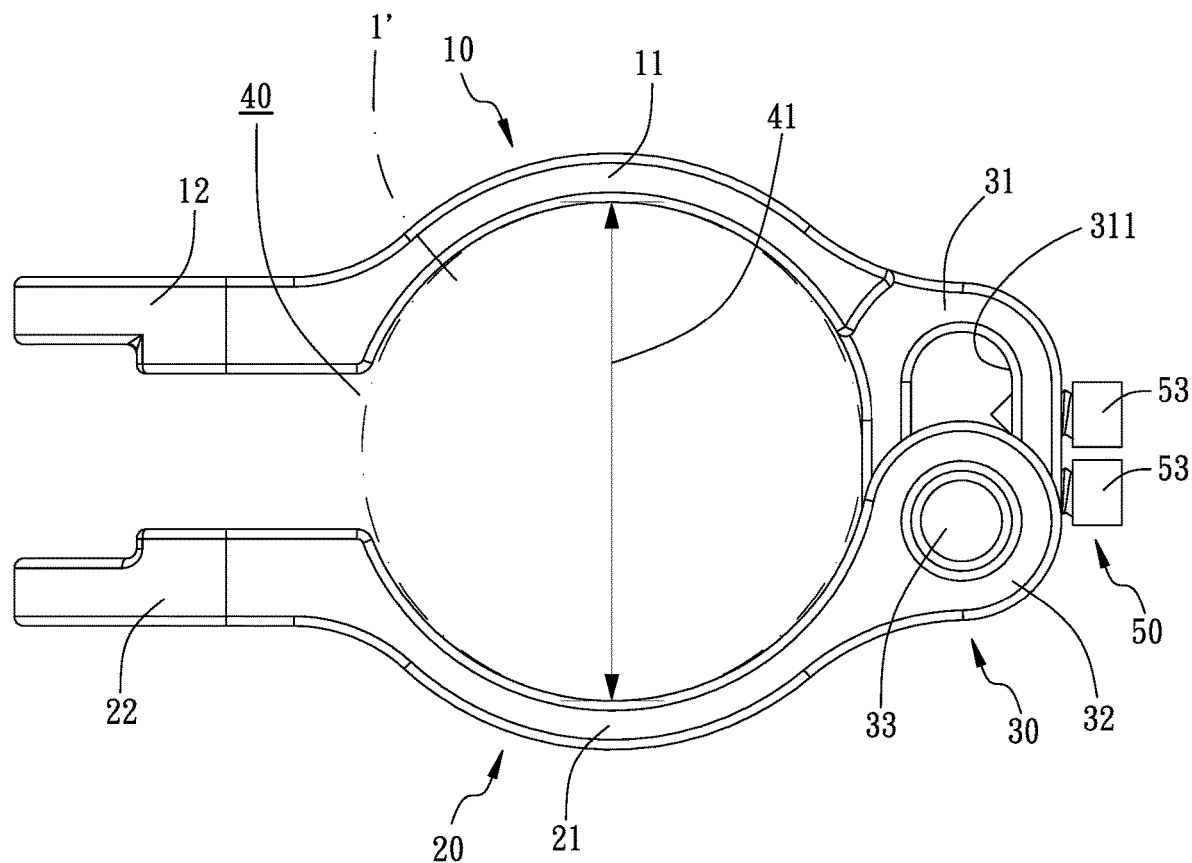
FIG. 6 is another operation schematic view illustrating the positioning rod passing through the second through hole, such that the first clamp member and the second clamp member moving away from each other.

Referring to FIG. 2, FIG. 4, and FIG. 5, when the positioning rod 53 passes through the first through hole 51, the axial shaft 33 is blocked by the positioning rod 53, so that the pivot portion 32 is positioned at one end of the adjusting portion 31. Also, the pivot portion 32 is in adjacent to the first clamping portion 11, so that the second clamp member 20 and the first clamp member 10 approach each other, thereby shortening the clamp distance 41 between the first clamp member 10 and the second clamp member 20 for clamping the tube member 1 having a relatively smaller tube diameter in the clamp space 40. Referring to FIG. 2, and FIG. 6, when the positioning rod 53 passes through the second through hole 52, the axial shaft 33 is blocked by the positioning rod 53, so that the pivot portion 32 is positioned at the other end of the adjusting portion 31. Also, the pivot portion 32 is away from the first clamping portion 11, so that the second clamp member 20 and the first clamp member 10 are distant from each other, thereby increasing the clamp distance 41 between the first clamp member 10 and the second clamp member 20 for clamping the tube member 1' having a relatively larger tube diameter in the clamp space 40.

With the foregoing configuration, the clamp distance 41 between the first clamp member 10 and the second clamp member 20 is adjustable through the adjustment upon the position of the axial shaft 33, so as to be used for clamping the tube members 1 or 1' having different tube diameters. Therefore, the utility range and the convenience of usage are improved for meeting actual usage demands.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An adjustable clamp structure, comprising:
a first clamp member comprising a first clamping portion and a first fixing portion formed on one end of the first clamping portion;
a second clamp member comprising a second clamping portion and a second fixing portion formed on one end of the second clamping portion; and
an adjustment member disposed between the first clamp member and the second clamp member, the adjustment member comprising an adjusting portion and a pivot portion that are movably combined, the adjusting portion further comprising a groove, the adjusting portion disposed on another end of the first clamping portion, the pivot portion disposed on another end of the second clamping portion on two sides of the adjusting portion and arranged in alignment with the groove, with an axial shaft passing through the pivot portion and the groove, and with a positioning member disposed on the adjustment member for blocking the axial shaft, such that the pivot portion is movably combined with one end of the adjusting portion;
wherein, the first clamp member and the second clamp member are combined through the adjustment member, with a clamp distance formed between the first clamping portion and the second clamping portion, such that the second clamp member is movably adjusted with respect to the first clamp member for adjusting a range of the clamp distance; the second clamp member pivots with respect to the first clamp member, and the axial shaft drives the pivot portion to move along the groove for adjusting the range of the clamp distance;
the positioning member further comprises a first through hole, a second through hole, and a positioning rod; the first through hole and the second through hole pass through the adjusting portion, and the positioning rod passes through one of the first through hole and the second through hole to resist against the axial shaft such that when the positioning rod passes through the first through hole, the pivot portion is positioned on one end of the adjusting portion in adjacent to the first clamping portion; when the positioning rod passes through the second through hole, the pivot portion is positioned on one end of the adjusting portion away from the first clamping portion.

2. The clamp structure of claim 1, wherein the second clamp member is structurally similar to the first clamp member; the first clamping portion and the second clamping portion are both formed in a semi-circular shape; the first clamp member and the second clamp member are combined to face each other, with a circularly-shaped clamp space formed between the first clamping portion and the second clamping portion for receiving a tube member; the clamp space is formed in a circular shape; the clamp distance in the clamp space is defined as a tube diameter of the corresponding tube member.

3. The clamp structure of claim 1, wherein each of the first fixing portion and the second fixing portion has a bore, respectively, and the two bores are arranged in alignment, such that a fastener passes through the bores.

* * * * *